(12) United States Patent
Fryc

(10) Patent No.: US 10,209,979 B2
(45) Date of Patent: Feb. 19, 2019

(54) SYSTEM AND METHOD FOR DISTRIBUTED REVISION CONTROL

(71) Applicant: Red Hat, Inc., Raleigh, NC (US)

(72) Inventor: Lukas Fryc, Brno (CZ)

(73) Assignee: RED HAT, INC., Raleigh, NC (US)

( * ) Notice: Subject to any disclaimer, the term of this patent is extended or adjusted under 35 U.S.C. 154(b) by 829 days.

(21) Appl. No.: 14/633,077

(22) Filed: Feb. 26, 2015

(65) Prior Publication Data

US 2016/0253373 A1    Sep. 1, 2016

(51) Int. Cl.
*G06F 17/30* (2006.01)
*G06F 8/65* (2018.01)
*G06F 8/71* (2018.01)

(52) U.S. Cl.
CPC ............ *G06F 8/65* (2013.01); *G06F 17/3023* (2013.01); *G06F 8/71* (2013.01)

(58) Field of Classification Search
CPC ........... G06F 8/65; G06F 17/3023; G06F 8/71
USPC ........................................................ 707/695
See application file for complete search history.

(56) References Cited

U.S. PATENT DOCUMENTS

| | | | |
|---|---|---|---|
| 6,138,251 A * | 10/2000 | Murphy ................ | G06F 9/4435 709/203 |
| 7,246,255 B1 | 7/2007 | Heideman et al. | |
| 7,647,525 B2 | 1/2010 | Lecrone et al. | |
| 7,818,522 B2 | 10/2010 | Bartfai et al. | |
| 7,908,247 B2 * | 3/2011 | Ngo .................... | G06F 17/2288 707/638 |
| 8,392,750 B2 | 3/2013 | Kaul | |
| 8,412,688 B1 * | 4/2013 | Armangau ........ | G06F 17/30088 707/690 |
| 8,572,031 B2 | 10/2013 | Merriman et al. | |
| 8,676,850 B2 * | 3/2014 | Sisco ................ | G06F 17/30159 707/791 |
| 8,775,373 B1 | 7/2014 | Ross et al. | |
| 2006/0015680 A1 * | 1/2006 | Otsuka ................ | G06F 11/1456 711/111 |

(Continued)

OTHER PUBLICATIONS

Birrell, Andrew, and Ted Wobber. "Distributed Garbage Collection for Network Objects—Microsoft Research." Microsoft Research, Microsoft, Dec. 1, 1993, www.microsoft.com/en-us/research/publication/distributed-garbage-collection-for-network-objects/. (Year: 1993).*

(Continued)

*Primary Examiner* — Robert W Beausoliel, Jr.
*Assistant Examiner* — Arthur Ganger
(74) *Attorney, Agent, or Firm* — Haynes and Boone, LLP

(57) ABSTRACT

A system and method for distributed revision control includes receiving, by a revision control module being executed by one or more processors of a server, a request to store a first version in a repository, the repository comprising a plurality of stored versions, determining whether the first version is in the repository, incrementing a client reference counter associated with the first version when the first version is in the repository, adding the first version to the repository and sending the first version to one or more additional servers when the first version is not in the repository, and decrementing a server reference counter associated with a second version in the repository when the first version replaces the second version as a head version of the repository.

20 Claims, 8 Drawing Sheets

(56) References Cited

U.S. PATENT DOCUMENTS

| | | | |
|---|---|---|---|
| 2009/0276471 A1* | 11/2009 | Baer | G06F 17/30011 |
| 2010/0223495 A1* | 9/2010 | Leppard | G06F 11/004 |
| | | | 714/6.11 |
| 2012/0101980 A1* | 4/2012 | Taleghani | G06F 17/2288 |
| | | | 707/608 |
| 2012/0290629 A1* | 11/2012 | Beaverson | G06F 17/30094 |
| | | | 707/827 |
| 2013/0138607 A1 | 5/2013 | Bashyam et al. | |
| 2014/0025651 A1* | 1/2014 | Schreter | G06F 17/30351 |
| | | | 707/695 |
| 2014/0071135 A1* | 3/2014 | Morsi | G06Q 10/10 |
| | | | 345/440 |
| 2014/0140354 A1 | 5/2014 | Mormina et al. | |
| 2014/0222758 A1* | 8/2014 | March | G06F 17/30212 |
| | | | 707/638 |

OTHER PUBLICATIONS

HP Serviceguard Extended Distance Cluster (EDC) with VxVM/CVM mirroring on HP-UX, Best practices, 26 Pages, 4AA1-8366ENW, May 2008.
Philipp Reisner, Rapid resynchronization for replicated storage Activity-logging for DRBD, 5 Pages, Jan. 27, 2004.
Using EMC Recoverpoint Concurrent Local and Remote for Operational and Disaster Recovery, Applied Technology, 29 Pages, May 2012.

* cited by examiner

SYSTEM AND METHOD FOR DISTRIBUTED REVISION CONTROL

RELATED APPLICATIONS

The present disclosure is related to concurrently filed U.S. Non-provisional patent application entitled "System and Method for Data Synchronization Using Revision Control" Ser. No. 14/633018, which is hereby incorporated by reference in its entirety.

BACKGROUND

The present disclosure relates generally to computing systems, and more particularly to distributed revision control.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transitory, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other over a network. In order to do so, a server or some other computing system may provide services for sharing documents, files, or other information among other computing devices or clients. The server may additionally provide revision control services to maintain consistency among the various versions of the shared document, such as versions that are generated when the data is modified by the one or more clients. In general, as the number of clients using the revision control service increases, the memory and processing resources on the server dedicated to providing the revision control service increases correspondingly. However, the server has limited memory and processing resources, which may limit the ability to scale the number of clients using the revision control service. The limitations on processing and memory resources are further amplified when the server providing revision control services maintains old, unused, and/or redundant versions of a shared document.

Accordingly, it would be desirable to provide systems and methods to reduce the processing and memory requirements and thus improve the scalability and efficiency of revision control systems and processes.

SUMMARY

According to one example, a method of revision control includes receiving, by a revision control module being executed by one or more processors of a server, a request to store a first version in a repository, the repository comprising a plurality of stored versions, determining whether the first version is in the repository, incrementing a client reference counter associated with the first version when the first version is in the repository, adding the first version to the repository and sending the first version to one or more additional servers when the first version is not in the repository, and decrementing a server reference counter associated with a second version in the repository when the first version replaces the second version as a head version of the repository.

According to another example, a revision control system includes a revision control module executed by one or more process of a server and a repository configured to provide access to a plurality of stored versions of a shared document. The revision control module is configured to receive a request to store a first version in the repository, determine whether the first version is in the repository, increment a client reference counter associated with the first version when the first version is in the repository; add the first version to the repository and send the first version to one or more additional servers when the first version is not in the repository; and decrement a server reference counter associated with a second version in the repository when the first version replaces the second version as a head version of the repository.

According to yet another example, non-transitory machine-readable medium includes a plurality of machine-readable instructions which when executed by one or more processors associated with a server are adapted to cause the one or more processors to perform a method. The method includes receiving a request to store a first version in a repository, the repository comprising a plurality of stored versions, determining whether the first version is in the repository, incrementing a client reference counter associated with the first version when the first version is in the repository, adding the first version to the repository and sending the first version to one or more additional servers when the first version is not in the repository, decrementing a server reference counter associated with a second version in the repository when the first version replaces the second version as a head version of the repository, receiving, from another server, a third version, adding the third version to the repository, determining whether the third version replaces a fourth version as a head version of the repository, incrementing a server reference counter associated with the third version and decrementing a server reference counter associated with the fourth version when the third version replaces the fourth version as the head version of the repository, receiving a request to retrieve a fifth version from the repository, determining whether the fifth version is in the repository, and retrieving the fifth version from the repository and decrementing a client reference counter associated with the fifth version when the fifth version is in the repository.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

In some revision control systems, a processing node, such as a server, may provide revision control services to services to maintain consistency among versions of a shared document, such as versions that are generated when the shared document is modified by the one or more additional processing nodes, such as clients. Because a given processing node has limited processing and memory resources, the ability to scale the number of clients using the revision control service is limited. In order to reduce the burden on a given processing node, it is generally desirable to spread the revision control service across a distributed set of processing nodes. In some examples, a distributed revision control system may synchronize document versions among the distributed processing nodes so that the system is capable of consistently handling requests to access and/or update a given version of the shared document, even when the version did not originate at the node receiving the request. In some examples, the distributed control system may implement techniques that reduce the number of old, unused and/or expired versions of the document stored by the system. In some examples, such techniques may be based on improved versions of synchronization and garbage collection methods. Without loss of generality, this improved revision control system will be described from the perspective of a plurality of distributed servers serving clients over a network. However, it is to be understood that the distribution of processor and memory resources across processing nodes can be achieved in a variety of other ways, such as using multiple processing nodes within a single hardware module (e.g., distributing the revision control system across multiple threads, processes, cores, and/or the like).

Figure 1:
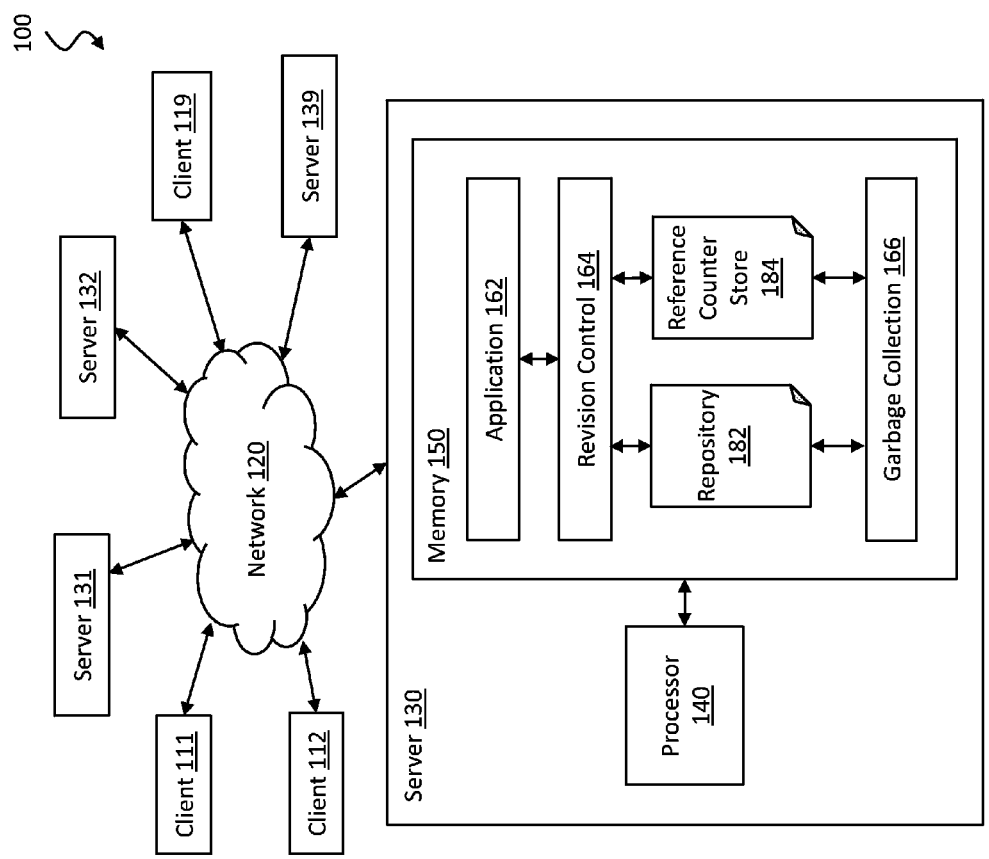
FIG. 1 is a simplified diagram of a revision control system according to some examples.

FIG. 1 is a simplified diagram of a distributed revision control system 100 according to some examples. One or more clients 111-119 are connected through a network 120 to one or more servers 130-139. Servers 130-139 may share similar features with one another and are thus described hereinafter from the perspective of server 130. In some examples, each of the clients 111-119 may be a computing device, a virtual machine, an application running on a computing device or virtual machine, and/or the like. Network 120 may be any kind of network including a local area network (LAN), such as an Ethernet, and/or a wide area network (WAN), such as the Internet. In some examples, server 130 may be a standalone workstation, a cluster, a production server, within a virtual machine, and/or the like. Server 130 includes a processor 140 coupled to memory 150. In some examples, processor 140 may control operation and/or execution of hardware and/or software on server 130. Although only one processor 140 is shown, server 130 may include multiple processors, CPUs, multi-core processors, field programmable gate arrays (FPGAs), application specific integrated circuits (ASICs), and/or the like. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 150 stores an application module 162, a revision control module 164, and a garbage collection module 166. Application module 162 is configured to share documents, files, and/or other data among the one or more clients 111-119. Because the clients 111-119 may generally synchronize with server 130 at different times from one another, different clients may use different versions of the shared document at a given time. Therefore, application module 162 is further configured to provide revision control services to ensure consistency among the shared document versions when the data is modified by the one or more clients 111-119. In some examples, the shared document may include any type of formatted data, including text, eXtensible Markup Language (XML), JavaScript Object Notation (JSON), and/or any other data format.

In order to access and/or update one or more document versions stored in memory 150, application module 162 is configured to store and retrieve the document versions through revision control module 164. In some examples, revision control module 164 may be configured to identify and/or track the document version associated with each of the clients 111-119, such as by maintaining a lookup table that associates each client with a document version and/or by receiving an identity of the document version associated with each client from the application module. Revision control module 164 may subsequently retrieve the document version from a repository 182. In addition, revision control module 164 may maintain reference counters associated with the document versions and store them in reference counter store 184. In some examples, garbage collection module 166 may also interface with repository 182 and/or reference counter store 184 in order to free memory resources of memory 150 by removing unused, little used, redundant, and/or expired document versions.

As discussed above and further emphasized here, FIG. 1 is merely an example which should not unduly limit the scope of the claims. One of ordinary skill in the art would recognize many variations, alternatives, and modifications. In some examples, other architectures may be used with modules 162, 164, and/or 166. For example, revision control module 164 may be a sub-module of application module 162 or vice versa. In some examples, modules 162, 164, and/or 166 may be hosted in one or more virtual machines and/or Java virtual machines running on server 130. In some examples, one or more portions of memory 150 may be hosted in server 130, coupled to server 130 using connectors and/or cabling, and/or coupled to server 130 over a network, such as network 120. In some examples, the functionality of servers 130-139 may be provided by multiple processing nodes in a single hardware module rather than using distributed hardware architecture. Similarly, the functionality of clients 111-119 may be may be provided by multiple processing nodes within the same and/or different hardware modules as servers 130-139. In such examples, functions of network 120 may be performed by any suitable inter-process communication technique for the given hardware architecture.

Figure 2:
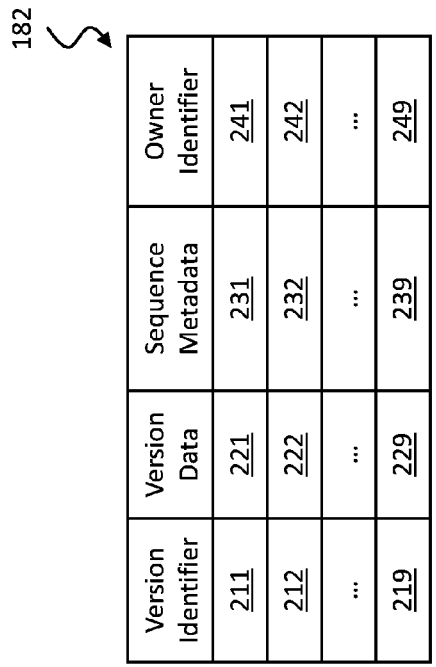
FIG. 2 is a simplified diagram of a repository according to some examples.

FIG. 2 is a simplified diagram of a repository 182 according to some examples. Repository 182 is merely depicted as a table for simplicity, and may alternately be configured as an array, dictionary, linked list, oriented tree graph, or any other data structure or combination of data structures suitable for storing and accessing the data entries described herein. In some examples, repository 182 may be stored in a database, such as a SQL database, NoSQL database, XML database, and/or the like. In some examples, repository 182 includes data entries for storing one or more version identifiers 211-219 assigned to each of the document versions stored in memory 150 at a given time. A version identifier may include any value that uniquely identifies a particular document version, such as a hash value, a sequence number, a timestamp, a client and/or server identifier, a piece of metadata, and/or the like and/or a suitable combination thereof. In some examples, when a version identifier includes a hash value, the hash value may include an MD5 hash and/or a SHA-1 hash. In some examples, repository 182 may be indexed by the version identifiers 211-219.

Repository 182 further includes data entries for storing version data 221-229 associated with each document version corresponding to version identifiers 211-219. A version data entry is used to access and/or reconstruct a particular document version. For example, a version data entry may include a copy of the document version, a compressed copy of the document version, a pointer to the document version, a patch, and/or the like. When a version data entry includes a patch, the patch may further include data used to reconstruct a particular document version from a committed version of the document (a complete copy of the document) by using, for example, a patching utility. The format and content of the patch may vary based on the particular patching tools and techniques used by distributed revision control system 100 as well as the format and content of the shared document. The patch may, in some examples, be reversible (i.e., for each patch, a reverse patch can be computed) and/or cumulative (i.e., for a sequential series of patches, a composite patch can be computed). In some examples, the patch may be a forward patch that is applied to an older committed copy of the document to reconstruct a more recent document version. In other examples, the patch may be a reverse patch that is applied to a newer committed copy of the document to reconstruct an older document version. In some examples, the patch may be a composite patch that is applied directly to a committed copy of the document to reconstruct a particular document version. In other examples, a patch may be a non-composite patch that is applied along with a sequential series of patches to a committed copy of the document to reconstruct a particular document version. In some examples, caching techniques may be used to pre-compute one or more of the reconstructed document versions from patches to improve the efficiency of retrieval.

Repository 182 further includes data entries for storing sequence metadata 231-239 associated with each document version corresponding to version identifiers 211-219. A sequence metadata entry records the time and/or order in which a document version was created, modified, and/or accessed. For example, a sequence metadata entry may include a timestamp, a sequence number, and/or a pointer to a preceding and/or following version (e.g. a parent and/or child version). When sequence metadata includes a timestamp, the timestamp may further be generated based on a system clock of server 130 at the time when a document version was first entered into repository 182. When sequence metadata includes a sequence number, the sequence number may further include a counter n indicating that a particular version was the nth version of the document created. When sequence metadata includes a pointer to a preceding and/or following version, the pointer may further include a version identifier of the preceding and/or following version. In some examples, sequence metadata may include an event log that tracks multiple events associated with the document version, such as creation, modification, deletion, and/or access.

Repository 184 further includes data entries for storing owner identifiers 241-249 associated with each document version corresponding to version identifiers 211-219. An owner identifier uniquely identifies an owner of each document version among servers 130-139. An owner identifier may include any known unique server identifier, such as a universally unique identifier (UUID), a media access control (MAC) address, an Internet Protocol (IP) address, a Transmission Control Protocol (TCP) or User Datagram Protocol (UDP) port number, an assigned name, a randomly assigned value, a hash value, and/or the like and/or a suitable combination thereof. In some examples, a special identifier may be used when server 130 (the present server) is the owner to indicate that the document version is locally owned.

Figure 3:
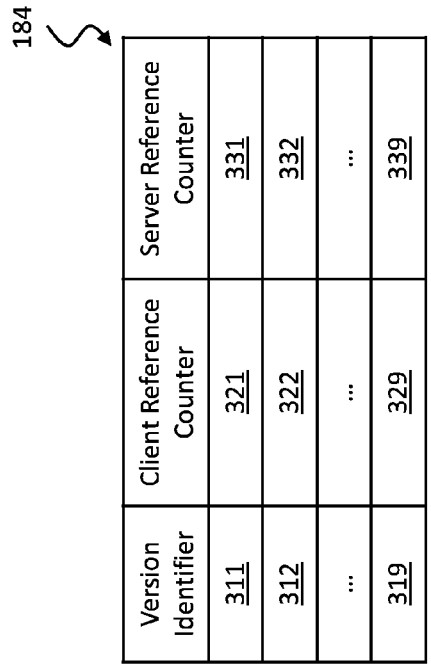
FIG. 3 is a simplified diagram of a reference counter store according to some examples.

FIG. 3 is a simplified diagram of a reference counter store 184 according to some examples. Reference counter store 184 is merely depicted as a table for simplicity, and may alternately be configured as an array, dictionary, linked list, oriented tree graph, or any other data structure or combination of data structures suitable for storing and accessing the data entries described herein. In some examples, reference counter store 184 may be stored in a database, such as a SQL database, NoSQL database, XML database, and/or the like. Reference counter store 184 includes data entries for storing one or more version identifiers 311-319 assigned to each of the document versions owned by server 130 at a given time. In some examples, revision history 184 may be indexed by the version identifiers 311-319. In general, the version identifiers 311-319 are a subset of the version identifiers 221-229 in repository 182 described in FIG. 2. More specifically, the version identifiers 311-319 may include the subset of version identifiers 211-219 that are associated with locally owned document versions (versions owned by server 130).

Reference counter store 184 further includes data entries for storing client reference counters 321-329 associated with each document version corresponding to version identifiers 311-319. A client reference counter entry records the number of clients 111-119 associated with a document version at a given point in time. For example, the client reference counter associated with a document version may be incremented each time a client is updated to that version from a different version during a client-server synchronization process. Conversely, the reference counter associated with a document version may be decremented by one each time a client is updated from that version to a different version during a client-server synchronization process. Although server 130 owns the document version, the client-server synchronization process involving the document version may occur between the client and any one of servers 130-139. When the client-server synchronization process occurs at a server other than server 130, the server performing the client-server synchronization sends a corresponding increment and/or decrement command to server 130. Upon receiving the command, server 130 increments and/or decrements the client reference counter accordingly. Client reference counters 321-329 may further be incremented and/or decremented as applicable when a client joins or leaves the group of clients 111-119 participating in distributed revision control system 100. In some examples, a client reference counter may include a list of client identifiers and/or the like rather than, and/or in addition to, a numerical count. Such a client reference counter allows determination of both the number and identities of the clients associated with a document version at a given time. In some examples, a client reference counter may include a flag and/or the like that indicates in a binary manner whether or not a document version is associated with one or more clients at a given time.

Reference counter store 184 further includes data entries for storing server reference counters 331-339 associated with each document version corresponding to version identifiers 311-319. A server reference counter entry records the number of servers 130-139 using the associated document version as a head version at a given point in time. The head version is the server's latest version that includes the accumulated updates to the shared document submitted to the server by other clients and/or servers in the revision control system at a given time. In some examples, the server's head version may be used to update a client's old document version during client-server synchronization. In some examples, such as when branched versions exist in the repository, a server may have more than one head version corresponding to each branch in the repository.

In some examples, the server reference counter associated with a document version may be incremented each time a server's head version is updated to that version from a previous head version during a server-server synchronization process. Conversely, the server reference counter associated with a document version may be decremented each time a server's head version is updated from that version to a different version during a client-server and/or server-server synchronization process. Although server 130 may be the owner of the document version, the client-server and/or server-server synchronization process involving the document version may occur between any pair of servers 130-139 and/or clients 111-119. When the client-server and/or server-server synchronization process results in a new head version for a server other than server 130, the server sends a corresponding increment and/or decrement command to server 130. Upon receiving the command, server 130 increments and/or decrements the server reference counter accordingly. Server reference counters 331-339 may further be incremented and/or decremented as applicable when a server joins or leaves the group of servers 130-139 participating in distributed revision control system 100. In some examples, a server reference counter may include a list of server identifiers and/or the like rather than, and/or in addition to, a numerical count. Such a server reference counter allows determination of both the number and identities of the clients associated with a document version at a given time. In some examples, a server reference counter may include a flag and/or the like that indicates in a binary manner whether or not a document version is associated with one or more clients at a given time.

According to some examples, maintaining server reference counters 311-319 by revision control system 100 may support one or more useful improvements over systems that do not maintain server reference counters. In some examples, server 130 (and/or one or more other servers among servers 130-139) may use a given document version as the head version even when no clients 111-119 are using the document version at a given time. Because no clients 111-119 are currently using the document version, a client reference counter associated with the document version may be zero. However, when the version is a head version, server 130 may update one or more of clients 111-119 to that version at a later time. In such examples, the use of server reference counters 311-319 may allow for revision control system 100 to track whether there is a potential for one or more clients 111-119 to use a document version at a future time even when no clients 111-119 are currently using the document version. For example, this tracking capability may prevent garbage collection module 166 from performing garbage collection on a document version that, while not currently in use, may have the potential to be used at a future time.

As discussed above and further emphasized here, FIGS. 2 and 3 are merely examples which should not unduly limit the scope of the claims. One of ordinary skill in the art would recognize many variations, alternatives, and modifications. In some examples, reference counter store 184 may be merged with repository 182 rather than being a separate data structure. In some examples, the client reference counters and/or server reference counters may have null values for document versions that are not locally owned. In some examples, repository 182 and/or reference counter store 184 may include additional columns for storing metadata associated with each version, such as the file size of the document version and/or the corresponding patch. In other examples, repository 182 and/or reference counter store 184 may include fewer columns than discussed above, as some of the data entries may not be used according to various examples.

Figure 4:
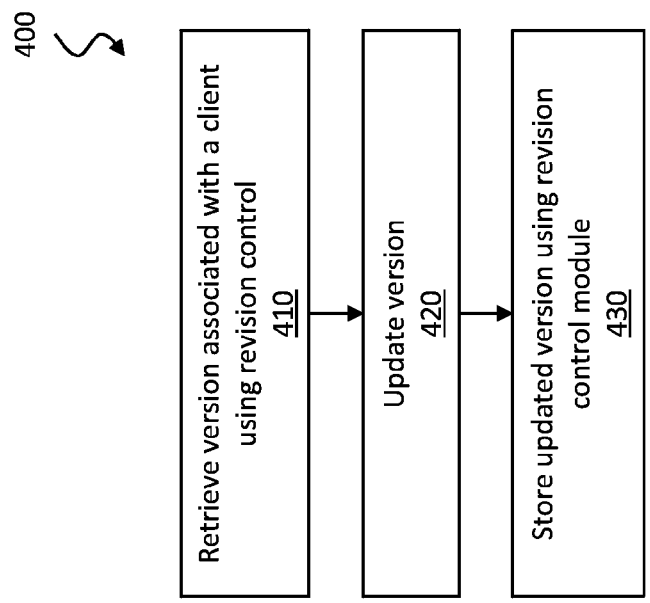
FIG. 4 is a simplified diagram of a method of client-server synchronization handling according to some examples.

FIG. 4 is a simplified diagram of a method 400 of client-server synchronization handling according to some examples. In some examples, one or more of the processes 410-430 of method 400 may be implemented, at least in part, in the form of executable code stored on non-transitory, tangible, machine readable media that when run by one or more processors (e.g., the processor 140 of server 130) may cause the one or more processors to perform one or more of the processes 410-430. In some examples, method 400 may be used by an application module of a present server among a set of distributed servers (e.g., application module 162 of server 130 among servers 130-139), to process a client-server synchronization request from a client (e.g., one of clients 111-119). In some examples, a client-server synchronization request may be sent by the client to the present server over a network (e.g., network 120) in order to update the client's version of a shared document and/or to edit the shared document to reflect modifications made by the client.

Figure 5:
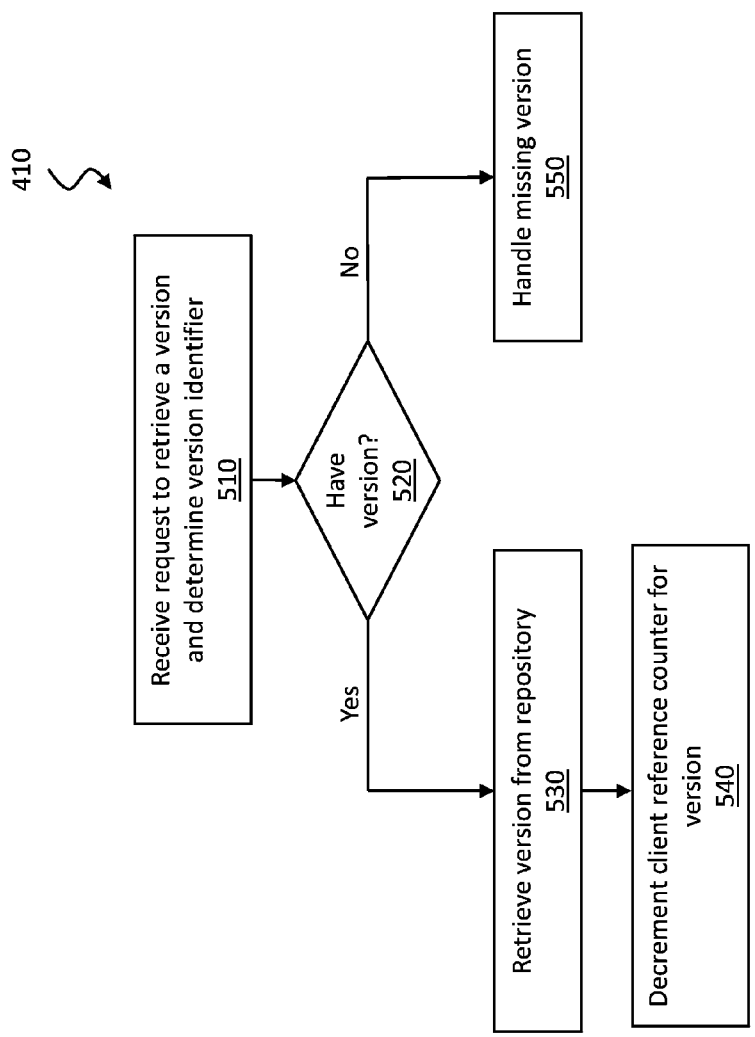
FIG. 5 is a simplified diagram of a method of retrieving a document version from a repository according to some examples.

At a process 410, a document version associated with the client is retrieved using a revision control system. In some examples, the application module may retrieve the one or more document versions by using a revision control module, such as revision control module 164. FIG. 5 is a simplified diagram of a method for performing process 410 of retrieving a document from revision control according to some examples. In some examples, this method may be used by the revision control module to fulfill document version retrieval requests from the application module.

At a process 510, a request to retrieve a document version is received and the version identifier of the document version is determined. In some examples, the request to retrieve a document version may include the version identifier (e.g., one of version identifiers 211-219) that uniquely identifies the document version being requested. In some examples, the version identifier may be determined from other information associated with the request. For example, the request may include a client identifier that uniquely identifies the client, in which case the version identifier associated with the client may be determined using a version lookup table. In some examples, a version identifier may include a hash value, such as an MD5 hash and/or a SHA-1 hash, of a copy of the document version maintained by the client.

At a process 520, it is determined whether the repository includes the requested document version. In some examples, the repository may be an instance of repository 182. As discussed previously, in relation to FIG. 2, the repository may be indexed using version identifiers that uniquely identify each document version, such as version identifiers 211-219. Thus process 520 may include searching the repository to determine whether the repository includes a version identifier that matches the version identifier of the requested document version. When a matching version identifier is found in the repository, the method 410 proceeds to processes 530 and 540 to retrieve the document version from the repository and decrement the associated client reference counter. When a matching version identifier is not found in the repository, the method 410 proceeds to a process 550 to handle the missing version.

At a process 530, the document version having a version identifier that matches the requested version identifier is retrieved from the repository. The repository stores version data that may be used to access and/or reconstruct the document version, such as version data 221-229. Thus, depending on the format of the version data, process 530 may involve steps to reconstruct a working copy of the document version from the version data. In some examples, when the version data includes a non-composite series of patches, process 530 may further include sequentially applying the one or more non-composite patches to a committed copy of the document in order to reconstruct the requested document version, for example, by using a patching utility. As discussed previously, in relation to FIG. 2, the particular technique used for applying the one or more patches may vary according to various examples.

At a process 540, a client reference counter for the document version is decremented. In some examples, the client reference counter may be an instance of client reference counters 321-329. Thus, the client reference counter may be stored in a reference counter store, such as reference counter store 184, maintained by the owner of the document version. In some examples, the owner of the document version may be determined based on the owner identifier associated with the document version. When the document version is locally owned (the owner is the present server), the client reference counter is stored in the locally-maintained reference counter store and may accordingly be decremented using local processes. When the document version is owned by another server among the distributed servers, the client reference counter may be decremented by sending a message to the owner. In some examples, the message may be sent to the owner through the network and may include the version identifier of the document version along with a request that the owner decrement the associated client reference counter. In some examples, the present server may use guaranteed delivery techniques to confirm that the message was correctly delivered to the owner and that the client reference counter was decremented by the owner before considering the process of decrementing the client reference counter to be complete. Decrementing the client reference counter indicates that the client has been updated from the retrieved document version to a different document version. In some examples, process 540 may occur concurrently with or immediately after process 530. In other examples, process 540 may occur during a later stage of method 400, for example, after it is determined that the client is being updated to a version that is in fact different from the retrieved version. In other examples, process 540 may occur after the server receives acknowledgement from the client that the updates to the document version has been successfully received and applied, at which point the client is no longer relying on the server to manage the retrieved document version.

When a matching version identifier is not found in the repository during process 520, the method 410 instead proceeds to a process 550 of handling the missing document version. In some examples, the document version may be missing from the present server but may be located at another server among the distributed servers. In such cases, there is a possibility that the present server may receive the missing document version from another server at a later time. Therefore, in some examples, process 550 may include waiting for a predetermined amount of time and then retrying process 410 from the start. In some examples, process 550 may include sending a message to the client associated with the document version to attempt client-server synchronization again later. In some examples, process 550 may include sending a message to the client to try a different server among the distributed servers. In some example, process 550 may include searching the repositories of other servers among the distributed servers to determine which servers, if any, have the missing document version. When the missing document is found at another server, process 550 may include sending a message to the client to try again using one of the servers that has the missing document version. In some examples, process 550 may include retrieving the missing document version from the other server and proceeding to process 530, having resolved the issue of the missing document version. Thus, according to various examples, the method 400 may in some cases terminate at process 550 when the missing document version is not found, continue at a different server when the missing document version is located at another server, and/or continue at the present server when the missing document version is found at another server and subsequently downloaded to the present server.

Referring back to FIG. 4, at a process 420, the document version retrieved during process 410 is updated. In some examples, process 420 may include applying edits to the document supplied by the client. In such examples, the edits may be applied in accordance with a client-server synchronization protocol. For example, edits may be applied to the retrieved document version by patching using any suitable patching utility, such as the patching utility used during process 530. In some examples, the document version is updated to include changes to the document submitted by other clients and/or servers since the client last performed client-server synchronization. In general, the changes to the document submitted by other clients and/or servers are reflected in the difference between the head version and the retrieved version of the document. Thus, in some examples, process 420 may include determining the difference between the head version and the retrieved version of the document, for example, by using a diff utility, and updating the document version to reflect the differences accordingly.

Figure 6:
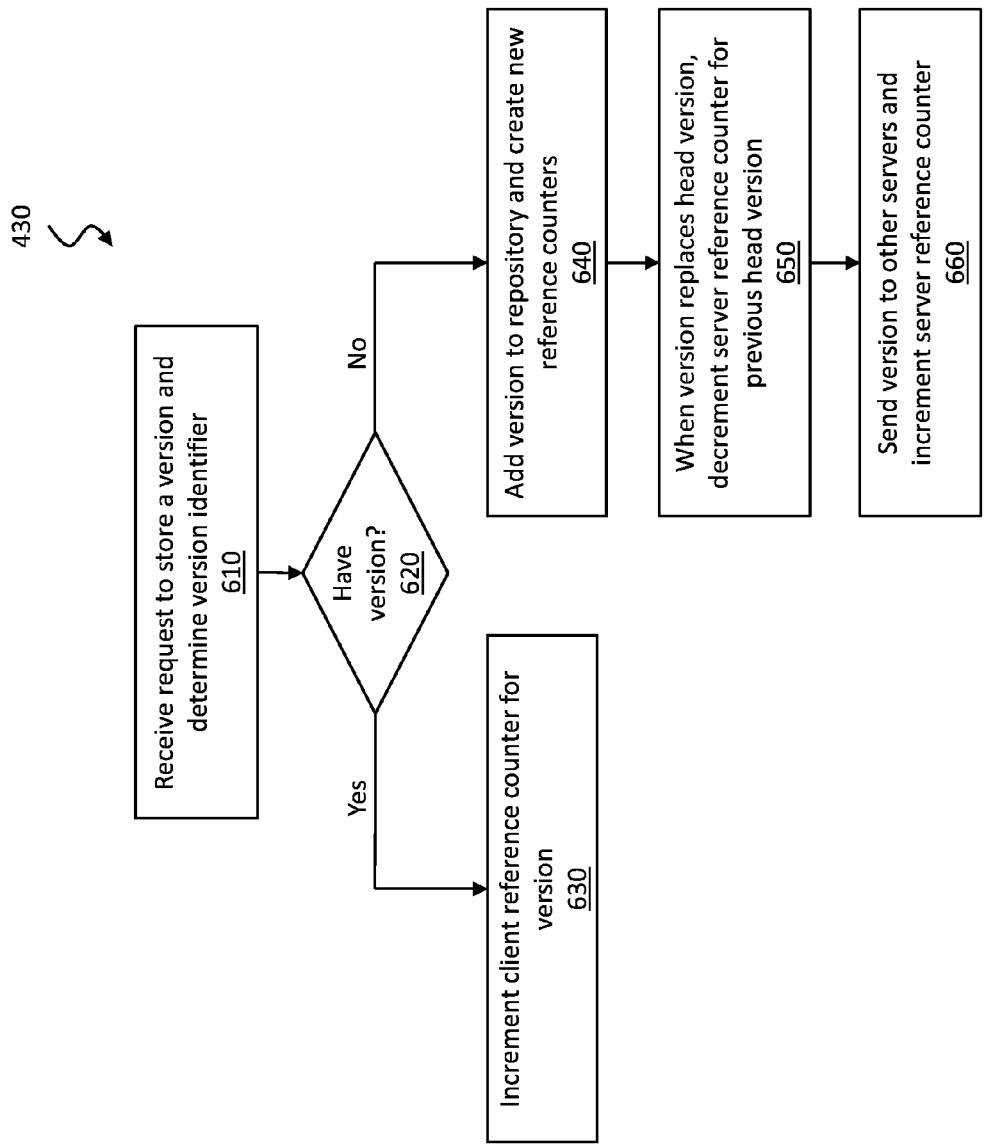
FIG. 6 is a simplified diagram of a method of storing a document version in a repository according to some examples.

At a process 430, the updated document version is stored using the revision control system. The stored document version is, in general, the updated copy of the document version that was retrieved using the revision control system during process 410 and updated during process 420. FIG. 6 is a simplified diagram of a method for performing process 430 of storing document versions according to some examples. In some examples, this method may be used by the revision control module to fulfill a request to store a document version from the application module.

At a process 610, a request to store a document version is received and a version identifier for the updated document version is determined. In some examples, the request to store a document version may include the version identifier (e.g., one of version identifiers 211-219) of the document. In some examples, the version identifier may be determined from other information associated with the request, such as version data associated with the document version. As discussed above, in relation to FIG. 2, the version identifier may include any value that uniquely identifies a document version, such as a hash value, a sequence number, a timestamp, a client and/or server identifier, a piece of metadata, and/or the like and/or a suitable combination thereof. When a version identifier includes a hash value, the hash value may include an MD5 hash and/or a SHA-1 hash. Thus, at process 610, the revision control module may be configured to compute and/or assign a unique version identifier to the document version in accordance with the selected type of unique identifier.

At a process 620, it is determined whether an existing entry is stored in the repository for the updated document version. For example, when the version identifier determined during process 610 includes a hash value of the updated document version, the revision control module may check for a matching hash value among version identifiers in the repository. When an existing entry is stored in the revision history, a corresponding client reference counter is incremented using a process 630. When an existing entry is not stored in the repository, a new entry is added to the repository using processes 640-660.

At a process 630, the client reference counter of the document version may be incremented. As discussed previously with respect to process 540, the client reference counter may be stored in a reference counter store, such as reference counter store 184, maintained by the owner of the document version. In some examples, the owner of the document version may be determined based on the owner identifier associated with the document version. When the document version is locally owned (the owner is the present server), the client reference counter is stored in the locally-maintained reference counter store and may accordingly be incremented using local processes. When the document version is owned by another server among the distributed servers, the client reference counter may be incremented by sending a message to the owner. In some examples, the message may be sent to the owner through the network and may include the version identifier of the document version along with a request that the owner increment the associated client reference counter. In some examples, the present server may use guaranteed delivery techniques to confirm that the message was correctly delivered to the owner and that the client reference counter was incremented by the owner before considering the process of incrementing the client reference counter to be complete. Incrementing the reference counter indicates that an additional client is now using the document version. In some examples, the sequence metadata of the existing version may be updated at process 630. As discussed previously, in relation to FIG. 2, the value of the sequence metadata entry may vary depending on the type of sequence metadata being used. In some examples, the sequence metadata value may include a timestamp set to the current time by using a system clock of the server. In other examples, the sequence metadata value may include a sequence number set to a value one more than the highest value among the sequence numbers for the other document versions in the repository. In some examples, the sequence metadata value may include a pointer to a preceding and/or following version of the document.

Alternately, when an existing entry is not found during process 620, at a process 640, a new entry is added to the repository for the document version. In some examples, one or more of the fields in the repository corresponding to the document version, such as the version identifier, version data, sequence metadata, and owner identifier fields, may be populated. As discussed above, in relation to FIG. 2, the version data may include various types of data used to access and/or reconstruct the updated document version. Thus, the process of adding version data to the repository may also vary accordingly, possibly involving additional steps and/or additional modifications to various document versions in the repository. For example, in the case where version data includes a patch, a diff between a committed copy of the document and the document version may be computed. In some examples, a forward patch is provided by the diff operation and stored in the version data entry of the updated document version in the repository. In these cases, future requests to retrieve the document version from the repository may apply the forward patch to an older committed copy. In some examples, a reverse patch may be provided by the diff operation. In these cases, the reverse patch may be stored in the version data entry of an existing committed copy, and the document version may replace the existing committed copy. Older document versions may then be retrieved by applying reverse patches sequentially to the new committed copy. The sequence metadata and owner identifier values corresponding to the document version also may be populated at process 640. In some examples, the owner of the document version may be the server from which a document version originated, in which case the owner identifier may be set to a value that indicates that the owner is the present server. As discussed previously, in relation to FIG. 3, the value set for the sequence metadata entry may vary depending on the type of sequence metadata being used. In some examples, the sequence metadata value may be a timestamp set to the current time by using a system clock of the server. In other examples, the sequence metadata value may be a sequence number set to a value one more than the highest value among the sequence numbers for the other document versions in the revision history. In some examples, the sequence metadata value may include a pointer to a preceding and/or following version of the document.

Additionally, at process 640 a new entry is added to the reference counter store for the updated document version. In some examples, the client reference counter and sequence reference counter values corresponding to the document version may also be populated at process 640. When the document version is being sent to a client as part of a client-server synchronization process, the client reference counter is initialized to a value of one. However, there may be cases in which the document version being stored is not associated with a client, in which case the client reference counter is initialized to a value of zero. Similarly, when the updated document version replaces the head version for the present server, the server reference counter is initialized to a value of one. However, there may be cases in which the updated document version does not replace the server's head version, in which case the server reference counter is initialized to a value of zero.

At a process 650, the server reference counter for the previous head version is decremented when the document version being stored replaces the head version. The server reference counter may be stored in a reference counter store, such as reference counter store 184, maintained by the owner of the document version. In some examples, the owner of the document version may be determined based on the owner identifier associated with the document version. When the document version is locally owned (the owner is the present server), the server reference counter is stored in the locally-maintained reference counter store and may accordingly be decremented using local processes. When the document version is owned by another server among the distributed servers, the server reference counter may be decremented by sending a message to the owner. In some examples, the message may be sent to the owner through the network and may include the version identifier of the document version along with a request that the owner decrement the associated server reference counter. In some examples, the present server may use guaranteed delivery techniques to confirm that the message was correctly delivered to the owner and that the server reference counter was decremented by the owner before considering the process of decrementing the server reference counter to be complete.

At a process 660, the document version is sent to other servers among the distributed servers. In some examples, sending the document version to other servers may include sending the version identifier, version data, sequence metadata, and/or owner identifier. In some examples, the document version may be sent in one or more server-server synchronization request messages. The server may distribute the document version among the distributed servers using any suitable technique. For example, the server may broadcast the server-server synchronization request messages to a plurality of servers among the distributed servers. In some examples, the server may send the server-server synchronization request message to a central server, which in turn distributes the document version among the other servers. When the document version replaces the head version of a recipient server, the recipient server may indicate to the present server that the server reference counter for the document should be incremented. In some examples, the recipient server may send a message received by the present server through the network, where the message includes the version identifier of the document version along with a request that the present server increment the associated server reference counter. In some examples, the present server may increment the server reference counter for the document version upon sending a synchronization message to a recipient server, and the recipient server may, in response, request that the present server decrement the server reference counter when the document version does not replace the head version of the recipient server. The latter example may be used to prevent the server reference counter from underreporting the number of servers for which the document version is the head version at a given time.

As discussed above and further emphasized here, FIGS. 4-6 are merely examples which should not unduly limit the scope of the claims. One of ordinary skill in the art would recognize many variations, alternatives, and modifications. In some examples, at process 430, document versions may be stored in the repository without checking for an existing entry during process 620. In this case, process 430 may store redundant versions in the revision history that may be removed later, for example, by using a garbage collection module, such as garbage collection module 166. In other examples, various steps may be added or removed to each process of method 400 to account for special cases and/or exceptions. An example of a special case may include a client requesting to join and/or disconnect from synchronization system 100, in which case one or more processes may be skipped, simplified, or otherwise suitably altered. An example of an exception may include attempting to retrieve a document version that no longer exists in any server repositories among the distributed servers, such as an expired version, in which case one or more processes may be added to method 400 in order to recover the missing document version information from the client. In fact, when a client or group of clients connects infrequently to server 130 and often requests expired versions of a document, the application module may be configured to fall back to a more optimal client-server synchronization method when interacting with such clients.

Figure 7:
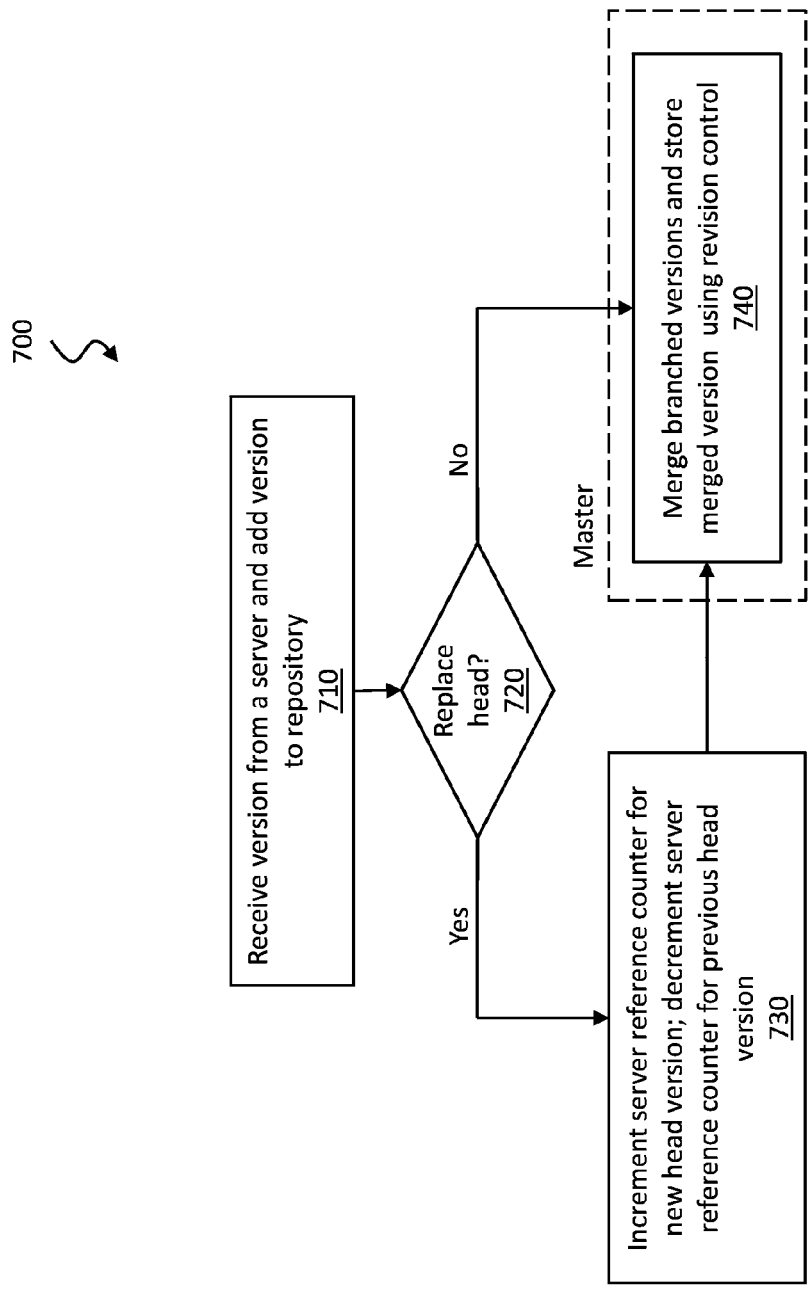
FIG. 7 is a simplified diagram of a method of server-server synchronization handling according to some examples.

FIG. 7 is a simplified diagram of method 700 of server-server synchronization handling according to some examples. In some examples, one or more of the processes 710-740 of method 700 may be implemented, at least in part, in the form of executable code stored on non-transitory, tangible, machine readable media that when run by one or more processors (e.g., the processor 140 of server 130) may cause the one or more processors to perform one or more of the processes 410-430. In some examples, method 700 may be used by a revision control module of a present server among distributed servers (e.g. revision control module 164 of server 130 among servers 130-139), to process a server-server synchronization request from another server (e.g., servers 131-139). In some examples, a server-server synchronization request may be sent by the other server to the present server over a network (e.g., network 120) during process 660 in order to distribute a new version of a shared document generated during the client-server synchronization process.

At a process 710, a document version is received from a server among the distributed servers and added to the repository. In examples consistent with FIGS. 4-6, the document version may be included in a server-server synchronization request message sent during process 660. Accordingly, the received document version may include a version identifier, version data, sequence metadata, and/or owner identifier. Based on the received document version, one or more of the fields in the repository corresponding to the document version, such as the version identifier, version data, sequence metadata, and owner identifier fields, may be populated. As discussed above, in relation to FIGS. 2 and 6, the version data may include various types of data used to access and/or reconstruct the updated document version. Thus, the process of adding version data to the repository may also vary accordingly, possibly involving additional steps and/or additional modifications to various document versions in the repository. For example, in the case where version data includes a patch, a diff between a committed copy of the document and the document version may be computed. In some examples, a forward patch is provided by the diff operation and stored in the version data entry of the updated document version in the repository. In these cases, future requests to retrieve the document version from the repository may apply the forward patch to an older committed copy. In some examples, a reverse patch may be provided by the diff operation. In these cases, the reverse patch may be stored in the version data entry of an existing committed copy, and the document version may replace the existing committed copy. Older document versions may then be retrieved by applying reverse patches sequentially to the new committed copy.

At a process 720, it is determined whether the received document version replaces the previous head version of the present server. In some examples, the determination may be made based on sequence metadata associated with the document version and the head version. For example, when the sequence metadata of the received document version indicates that the parent version of the received document version is the current head version, the received version replaces the current head version as the server's head version. Alternately, the received document may point to a different parent version, such as the same parent version as the head version. In this case, the head version may not be replaced, and/or additional parameters may be compared to determine whether the head version is replaced. In some examples, an additional parameter may include a timestamp (e.g., the more recent version becomes the head version) and/or a sequence number (e.g., the higher sequence number becomes the head version).

When the received document version replaces the head version, the corresponding server reference counters of the received document version and previous head version are updated at a process 730. In some cases, the received document version may generate branched versions (multiple versions that point back to a common parent version) in the repository. When the server is not a master server (tasked with merging branched versions), the method 700 may terminate after process 720 and/or process 730 without merging the branched versions. However, when the server is a master server, the method 700 proceeds to process 740 in order to merge the branched versions. The master server may be determined by any suitable method. In some examples, the master server may be a designated server among the distributed servers that centrally manages the merging operations. In some examples, the master server responsibilities may be shared among the distributed servers, for example, using a round robin protocol for determining which server is responsible for performing merges at a given time. In some examples, multiple servers may be designated as master servers concurrently, although in such a configuration appropriate measures may be taken to ensure that the merge operations are consistently applied among the distributed master servers.

At a process 730, the server reference counter for the new head version is incremented and the server reference counter for the previous head version is decremented. For each of the document versions, the corresponding server reference counter may be stored in a reference counter store, such as reference counter store 184, maintained by the owner of the document version. In some examples, the owner of each of the document versions may be determined based on the owner identifier associated with the document version. When the document version is locally owned (the owner is the present server), the server reference counter is stored in the locally-maintained reference counter store and may accordingly be incremented and/or decremented using local processes. When the document version is owned by another server among the distributed servers, the server reference counter may be incremented and/or decremented by sending a message to the owner. In some examples, the message may be sent to the owner through the network and may include the version identifier of the document version along with a request that the owner increment and/or decrement the associated server reference counter. As discussed previously with respect to process 720, when the server is not a master server (tasked with merging branched versions), the method 700 may terminate after process 730 without resolving the branched versions. However, when the server is a master server, the method 700 proceeds to process 740 to merge the branched versions.

At a process 740, the branched versions are merged and the resulting merged version is stored using the revision control system. Merging the branched versions is performed using any suitable merging technique, such as a three-way merge, a weave merge, patch commutation merge, and/or the like. The result of the merge operation is a merged document version that incorporates updates from the two or more branched versions relative to the common parent version. The merged version is then stored in the repository. In some examples consistent with FIGS. 4-6, the merged version may be stored in the repository using a process similar to process 430. Accordingly, storing the merged version in the repository may include one or more of the steps of adding the version to the repository, creating new client and server reference counters in the reference counter store, decrementing the server reference counter for the previous head version, and/or sending the merged version to other servers among the distributed servers.

As discussed above and further emphasized here, FIG. 7 is merely an example which should not unduly limit the scope of the claims. One of ordinary skill in the art would recognize many variations, alternatives, and modifications. For example, method 700 may be modified to allow ownership of a document version to be transferred from one server to another during server-server synchronization. In such examples, the server-server synchronization request message may include client and/or server reference counters and/or additional modified request parameters to accommodate the transfer of ownership. According to some examples, at the process 710, data associated with the received document version may be modified and/or supplemented prior to adding the document version to the repository. For example, a timestamp may be added to the sequence metadata to indicate when the document version was received, and or a sequence number included in the sequence metadata may be modified to match the numbering of the present server. In some examples, the owner identifier entry may be based on metadata associated with the server-server synchronization request message (e.g., a source IP address of the message and/or the like) rather than the data included in the message. In some examples, the master server may not perform process 740 for merging branched versions in response to detecting branched versions. Instead, the master server may synchronize with other servers using a synchronization technique such as Differential Synchronization, in which case process 740 for merging branched versions may be built in to the synchronization technique rather than being a separate process. In some examples, the synchronization technique may result in merged versions being formed independently at each of the servers rather than being sent from the master server to the other servers.

Figure 8:
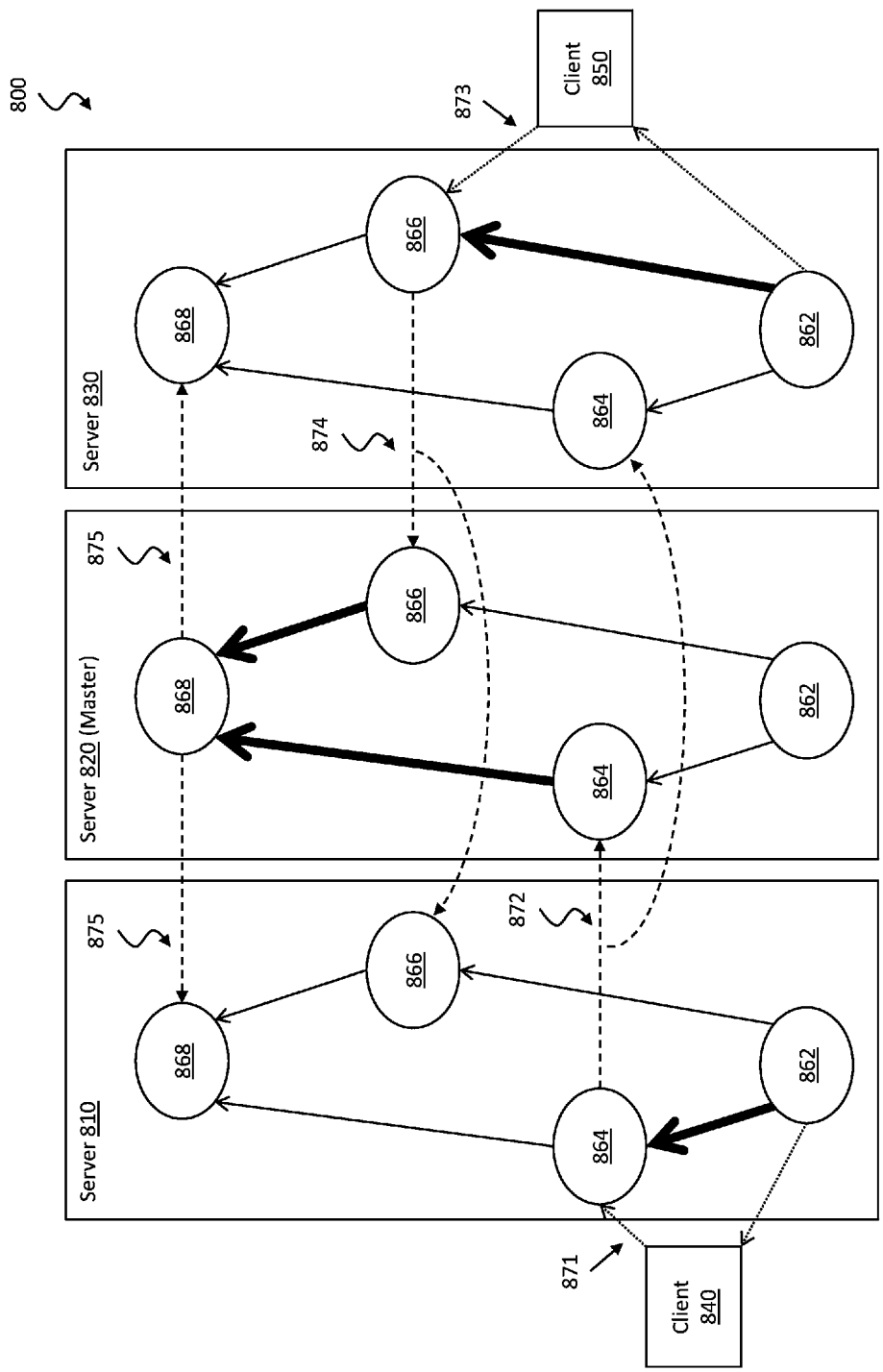
FIG. 8 is a simplified diagram of a revision control system illustrating a sequence of updates to a shared document.

FIG. 8 is a simplified diagram of a revision control system 800 illustrating a sequence of updates to a shared document. According to some examples consistent with FIGS. 1-7, servers 810-830 may be instances of servers 130-139, and clients 840 and 850 may be instances of clients 111-119. Servers 810-830 and clients 840 and 850 may communicate with one another over a network, such as network 120. Servers 810-830 maintain document versions 862-868 using revision control techniques consistent with FIGS. 1-7. In some examples, the document versions may be stored in a repository, such as repository 182, of the corresponding server. The document versions may further be associated with client and/or server reference counters stored in a reference counter store, such as reference counter store 184, of an owner of each document version.

Initially, each server 810-830 maintains a copy of a first document version 862. Subsequently, client 840 and server 810 perform client-server synchronization 871. During client-server synchronization 871, document version 862 is retrieved and updated according to the client-server synchronization technique being used. In some examples, server 810 may handle client-server synchronization 871 using method 400. In such examples, document version 862 may be retrieved and updated using processes 410 and 420, and the resulting updated document version 864 may be stored using process 430. In some examples, document version 864 may replace document version 862 as the head version of server 810. Therefore, in accordance with method 400, the client reference counter corresponding to document version 812 is decremented to reflect that client 840 is no longer using this version, and the server reference counter corresponding to document version 862 is decremented to reflect that this version is no longer the head version of server 810.

Because document version 864 is a new document version, document version 864 is added to the repository of server 810 and is sent to servers 820 and 830 via server-server synchronization 872. In some examples, servers 820 and 830 may handle server-server synchronization 872 using method 700. In such examples, document version 864 is added to the repositories of servers 820 and 830. At the end of client-server synchronization 871 and server-server synchronization 872, the client reference counter of document version 864 is one to reflect that the client 840 is using this version, and the server reference counter of document version 864 is three to reflect that version 864 is the head version of each of servers 810-830. In some examples, server 810 is designated as the owner of document version 864 because the document version originated at server 810. In some examples, the owner of document version 864 may be selected based on another suitable technique. For example, the owner may be determined using an algorithm for equally distributing ownership among servers 810-830, such as performing a modulo operation on a version number included in the version identifier (i.e. the remainder after dividing the version number by the number of servers).

Next, client 850 and server 830 perform client-server synchronization 873. During client-server synchronization 873, document version 862 is retrieved and updated to form updated document version 866. In this case, unlike client-server synchronization 871, the client-server synchronization 873 results in branching, as versions 864 and 866 share the same parent version 862. Further, in some examples, version 866 may not replace version 864 as the head version of server 860, as versions 864 and 866 are both one generation removed from version 862. Accordingly, after client-server synchronization 873 and server-server synchronization 874, the client reference counter of document version 866 is one to reflect that client 850 is using this version, and the server reference counter of document version 866 is zero as none of servers 810-830 are using version 866 as their head version. In some examples, server 830 is the owner of document version 866 because the document version originated at server 830.

Next, server 820, recognizing the branch between versions 864 and 866 and being designated as the master server responsible for merging branched versions, merges the branched versions 864 and 866 to form merged version 868. The merged version is distributed to servers 810 and 830 via server-server synchronization 875. The merged version 868 replaces version 864 as the head version of each of servers 810-830. Accordingly, after server-server synchronization 875, the client reference counter of document version 868 is zero as no clients are using this version, and the server reference counter of document version 868 is three to reflect that version 868 is the head version of each of servers 810-830. The server reference counter of version 864 is decremented from three to zero because none of servers 810-830 are continuing to use version 864 as their head version once they receive merged version 864. In some examples, server 820 is the owner of document version 886 because the document version originated at server 820.

As discussed above and further emphasized here, FIG. 8 is merely an example which should not unduly limit the scope of the claims. One of ordinary skill in the art would recognize many variations, alternatives, and modifications. In some examples, revision control system 800 may include more or fewer servers and/or clients than depicted in FIG. 8. In some examples, the functionality of servers 810-830 may be provided by multiple processing nodes in a single hardware module rather than using a distributed hardware architecture. Similarly, the functionality of clients 840 and 850 may be provided by multiple processing nodes within the same and/or different hardware modules as servers 810-830. In some examples, master server 820 may not form merged version 868 in response to detecting branched versions 864 and 866. Instead, master server 820 may synchronize with servers 810 and 830 using a synchronization technique such as Differential Synchronization, in which case version 868 may be formed during server-server synchronization rather than during a separate step. In some examples, server-server synchronization may result in merged version 868 being formed independently at each of the servers rather than being sent from master server 820 to servers 810 and 830.

Figure 9:
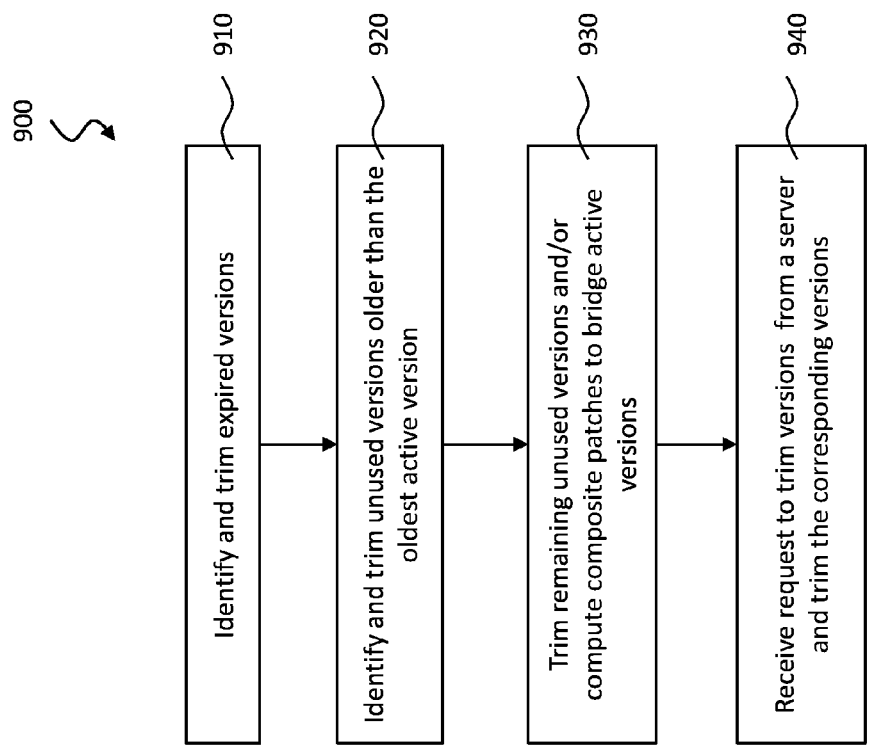
FIG. 9 is a simplified diagram of a method of garbage collection according to some examples.

FIG. 9 is a simplified diagram of a method 900 of garbage collection according to some examples. In some examples, method 900 may be used by a garbage collection module, such as garbage collection module 168, to remove unused, little used, redundant, and/or expired document versions from a repository. In some examples, the repository may be an instance of repository 184. The garbage collection module may use method 900 when triggered by any suitable set of conditions, such a periodic timer and/or an alert that a memory, such as memory 150, is approaching full capacity. In some examples, method 900 may be used according to a dynamic set of conditions based on, for example, the availability of processor and/or memory resources, the number of clients and/or servers, the size of the shared document, and/or any other relevant factors and/or combinations thereof.

At a process 910, expired document versions in the repository are identified and trimmed. In some examples, expired document versions may be identified by comparing sequence metadata associated with each document version in the repository, such as sequence metadata entries 231-239, to a predetermined threshold. For example, a document version may be identified as expired when a document version was created before the predetermined threshold. In this case, the predetermined threshold may represent a duration, such as one month or one year before the present, or alternately may represent a cutoff date. In another example, a document version may be identified as expired when a document version is one of the last n recently created document versions. In this case, the predetermined threshold may represent n, i.e., the number of recent versions to retain. In some examples, the predetermined threshold may be a more complex set of conditions that combine, for example, aspects of each of the examples above. In some examples, the predetermined threshold may be a fixed value. In other examples, the predetermined threshold may be dynamically configured based on, for example, the availability of processor and/or memory resources, the number of clients and/or servers, the size of the shared document, and/or any other relevant factors and/or combinations thereof.

Once identified, expired document versions in the repository are trimmed. In general, trimming an expired document version releases at least a portion of the memory resources that had been dedicated to that document version. This can be accomplished in a variety of ways. In some examples, trimming an expired document version may include deleting each of or part of the data entries in the repository associated with an expired document version from memory entirely. In other examples, trimming an expired document version may include moving data associated with the document version from a high-speed memory, such as random access memory (RAM), to a secondary memory, such as a magnetic disk. In some examples, trimming an expired document version may include deleting a complete copy of the document stored in the version data entry in the repository and replacing the entry with a compressed version and/or a reduced-size patch. In some examples, the expired document versions may no longer be retrieved from the repository after trimming. In some examples, the document versions may remain available for retrieval after trimming, although the retrieval process, such as process 410, may include one or more additional steps such as fetching the document from secondary memory, decompression and/or patch application.

In a distributed revision control system that includes a plurality of distributed servers, a present server performing method 900 may be responsible for identifying and trimming expired document versions that are owned by the present server. Accordingly, trimming an expired document may include sending a message to other servers among the distributed servers indicating that a particular document version should be trimmed. In some examples, the message may be sent to the other servers over a network and may include the version identifier of the document version along with a request that the owner trim the document version. In some examples, trimming a document version in a distributed revision control system may include removing the document version on some servers among the distributed servers while keeping the document version on other servers.

At a process 920, unused document versions in the repository that are older than the oldest active document version are identified and trimmed. In some examples, unused document versions may be identified by comparing client and/or server reference counters associated with each document version in the reference counter store, such as client reference counters 321-329 and/or server reference counters 331-339, to a corresponding predetermined threshold. In some examples, the predetermined threshold for the client reference counters may be different than the predetermined threshold for the server reference counters. In some examples, the predetermined threshold may be zero, in which case unused versions that are not associated with any clients and/or servers at a given time are identified as unused. Alternately, the predetermined threshold may be larger than zero, in which case versions currently in use by fewer clients and/or servers than the predetermined threshold are identified as unused. Document versions in use by more clients and/or servers than the predetermined threshold are identified as active. A second condition for trimming at process 920 is that a document version identified as unused is older than the oldest active document version. To make this determination, the oldest active document version among active document versions is identified, for example, by checking the sequence metadata. The unused document versions that are determined to be older than the oldest active version may then be trimmed from the repository in a similar manner to process 910. The unused document versions that are determined not to be older than the oldest active version may be retained in memory or may be trimmed using a process 930.

At the process 930, one or more remaining unused document versions after processes 910 and 920 may also be trimmed. When the version data associated with the document versions in the repository includes non-composite patches, process 930 may include computing cumulative patches to bridge active document versions. Because patches associated with unused document versions may bridge a pair of active document versions, the cumulative patches retain the patching information used to reconstruct the active document versions that had been stored in association with the unused document version. In some examples, the cumulative patches replace one or more of the patches associated with active document versions in the repository. Once the cumulative patches are computed and stored, the unused document versions and/or their respective patches may be trimmed in a similar manner to processes 910 and 920.

At the process 940, a request to trim one or more document versions is received from a server among the distributed servers, and the corresponding document versions are trimmed. In some examples, the request to trim a document version may originate from the owner of the document version. In some examples, the request to trim a document version may originate from a central server designated to provide garbage collection services. In some examples, the request may be formatted as a message sent over the network, the message including one or more version identifiers corresponding to the document versions to be trimmed along with a request to trim the identified versions. In some examples, the server sending the message may also performing method 900, in which case the message may correspond to the message described previously with respect to process 910.

As discussed above and further emphasized here, FIG. 9 is merely an example which should not unduly limit the scope of the claims. One of ordinary skill in the art would recognize many variations, alternatives, and modifications. For example, processes 910-940 may be performed concurrently, sequentially, and/or independently of one another. In some examples, the predetermined thresholds used during processes 910-940 to determine whether a particular document version is trimmed may be combined into a more complex condition or set of conditions used to make the determination. For example, an aggregated metric based on the sequence metadata, the reference counters, and/or other data and/or metadata associated with each document version may be computed and compared to a corresponding aggregated threshold value to determine whether a version is trimmed. In another example, when the predetermined threshold for determining whether a document version is unused is greater than zero, and a document version is determined to be unused even though it is associated with one or more clients and/or servers, then a second condition, such as a condition based on the sequence metadata of the version, may be used to determine if the version is trimmed. Thus, for example, a document version that is used by only a few clients may be trimmed if it is more than a few months old but may not be trimmed if it was created in the last few days, while a document version that is used by many clients may not be trimmed in either case.

Further, different variants of method 900 may be performed depending on the system status and/or the content of the repository at a given time. For example, an aggressive variant of method 900 may be performed when memory resources are constrained and/or when repository 182 contains non-critical data. The aggressive variant may include performing processes 910-930 using threshold values that result in a large number of document versions being trimmed. Conversely, a passive variant of method 900 may be performed when memory resources are not constrained and/or when the revision history contains critical data. The passive variant may include performing a subset of processes 910-940 and/or using threshold values that result in fewer document versions being trimmed. In some examples, the distributed servers may exchange information with one another about memory resources and/or other parameters used to determine the threshold values to ensure consistent garbage collection results among the distributed servers.

Method 900 may further include additional processes, such as dispatching an alert message to the revision control module when a version is removed that is still in use by one or more clients and/or trimming duplicate versions from the repository. In some examples, method 900 may be configured to halt once a predetermined number of versions are trimmed or a predetermined amount of memory is released. For example, method 900 may be performed iteratively using progressively more aggressive threshold values until the predetermined criteria for halting is reached. In other examples, the threshold values may include ranges of values for which different trimming techniques may be used. For example, document versions ranging between one month and one year old may be trimmed by transfer from a primary to secondary memory and/or may continue to be accessible in the repository, while document versions older than one year may be trimmed by permanent deletion and/or may no longer be accessible in the repository.

Some examples of server 130 and/or memory may include non-transitory, tangible, machine readable media that include executable code that when run by one or more processors (e.g., processor 140) may cause the one or more processors to perform the processes of methods 400-700 and 900 as described above. Some common forms of machine readable media that may include the processes of methods 400-700 and 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of revision control, the method comprising:
receiving, by a revision control module being executed by one or more processors of a server, a request to store a first version in a repository, the repository comprising a plurality of stored versions;
determining whether the first version replaces a second version among the plurality of stored versions as a head version of the repository; and
when the first version replaces the second version as the head version:
determining an owner of the second version among one or more additional servers; and
sending a message to the owner of the second version that requests that the owner decrement a server reference counter associated with the second version, the server reference counter indicating a number of servers using the second version as the head version at a given point in time.

2. The method of claim 1, further comprising:
receiving, from another server, a third version;
determining whether the third version is in the repository; and
when the third version is not in the repository, adding the third version to the repository.

3. The method of claim 2, further comprising, when the server is designated as a master server, merging branched versions in the repository, forming a fourth version, and sending the fourth version to the one or more additional servers.

4. The method of claim 1, further comprising:
receiving a request to retrieve a third version from the repository;
determining whether the third version is in the repository; and
when the third version is in the repository, retrieving the third version from the repository and decrementing a client reference counter associated with the third version.

5. The method of claim 1, further comprising trimming a first one of the stored versions in the repository when a corresponding client reference counter associated with the first one of the stored versions is below a first predetermined threshold and a corresponding server reference counter associated with the first one of the stored versions is below a second predetermined threshold.

6. The method of claim 5, wherein trimming the first one of the stored versions comprises computing one or more composite patches based on a patch associated with the first one of the stored versions.

7. The method of claim 5, wherein sequence metadata associated with the first one of the stored versions indicates that the first one of the stored versions is older than an oldest active stored version, the oldest active stored version being an oldest stored version in the repository that has corresponding client and server reference counters above the first and second predetermined thresholds, respectively.

8. The method of claim 5, wherein trimming the first one of the stored versions comprises moving the first one of the stored versions from a primary memory to a secondary memory.

9. The method of claim 5, wherein trimming the first one of the stored versions comprises moving the first one of the stored versions from a primary memory to a secondary memory.

10. The method of claim 1, further comprising receiving a request to trim a first one of the stored versions in the repository from another server and trimming the first one of the stored versions.

11. The method of claim 1, wherein the repository comprises version identifiers, version data, sequence metadata, and owner identifiers for each of the plurality of stored versions.

12. The method of claim 11, further comprising maintaining client and server reference counters for each of the plurality of stored versions that are owned by the server.

13. The method of claim 11, wherein the version identifiers uniquely identify each of the plurality of stored versions, the version identifiers including hash values of each of the plurality of stored versions.

14. A revision control system comprising:
a revision control module executed by one or more processors of a server; and
a repository configured to provide access to a plurality of stored versions of a shared document;
wherein the revision control module is configured to:
receive a request to store a first version in the repository;
determine whether the first version replaces a second version as a head version of the repository; and
when the first version replaces the second version as the head version:
determine an owner of the second version among one or more additional servers; and
send a message to the owner of the second version that requests that the owner decrement a server reference counter associated with the second version, the server reference counter indicating a number of servers using the second version as the head version at a given point in time.

15. The revision control system of claim 14, wherein the revision control module is further configured to:

receive, from another server, a third version;
determine whether the third version is in the repository; and
when the third version is not in the repository, add the third version to the repository.

16. The revision control system of claim 15, wherein the revision control module is further configured to merge branched versions in the repository to form a fourth version and send the fourth version to the one or more additional servers when the server is designated as a master server.

17. The revision control system of claim 14, wherein the revision control module is further configured to:
receive a request to retrieve a third version from the repository;
determine whether the third version is in the repository; and
when the third version is in the repository, retrieve the third version from the repository and decrement a client reference counter associated with the third version.

18. The revision control system of claim 14, further comprising a garbage collection module configured to trim a first one of the stored versions in the repository when a corresponding client reference counter associated with the first one of the stored versions is below a first predetermined threshold and a corresponding server reference counter associated with the first one of the stored versions is below a second predetermined threshold.

19. A non-transitory machine-readable medium comprising a plurality of machine-readable instructions which when executed by one or more processors associated with a server are adapted to cause the one or more processors to perform a method comprising:
receiving a request to store a first version in a repository, the repository comprising a plurality of stored versions;
determining whether the first version replaces a second version as a head version of the repository;
when the first version replaces the second version as the head version, determining an owner of the second version among one or more additional servers and sending a message to the owner of the second version that requests that the owner decrement a server reference counter associated with the second version, the server reference counter indicating a number of servers using the second version as the head version at a given point in time;
receiving, from another server, a third version; and
when the server is designated as a master server, merging branched versions in the repository based on the third version, forming a fourth version, and sending the fourth version to the one or more additional servers.

20. The non-transitory machine-readable medium of claim 19, wherein the method further comprises trimming a first one of the stored versions in the repository when a corresponding client reference counter associated with the first one of the stored versions is below a first predetermined threshold and a corresponding server reference counter associated with the first one of the stored versions is below a second predetermined threshold.

* * * * *